US007451173B1

(12) United States Patent
Van Benthem et al.

(10) Patent No.: US 7,451,173 B1
(45) Date of Patent: Nov. 11, 2008

(54) FAST COMBINATORIAL ALGORITHM FOR THE SOLUTION OF LINEARLY CONSTRAINED LEAST SQUARES PROBLEMS

(75) Inventors: Mark H. Van Benthem, Middletown, DE (US); Michael R. Keenan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 793 days.

(21) Appl. No.: 10/938,444

(22) Filed: Sep. 9, 2004

Related U.S. Application Data

(60) Provisional application No. 60/501,879, filed on Sep. 9, 2003.

(51) Int. Cl.
*G06F 17/16* (2006.01)
(52) U.S. Cl. .................................................... 708/607
(58) Field of Classification Search .................. 708/607
See application file for complete search history.

(56) References Cited

U.S. PATENT DOCUMENTS

| 6,584,413 B1 * | 6/2003 | Keenan et al. ................ 702/28 |
| 6,675,106 B1 * | 1/2004 | Keenan et al. ................ 702/28 |
| 7,296,047 B1 * | 11/2007 | Walster et al. .............. 708/446 |
| 2004/0015531 A1 * | 1/2004 | Walster et al. .............. 708/446 |

OTHER PUBLICATIONS

Rasmus Bro, "A Fast Non-Negativity-Constrained Least Squares Algorithm," Journal of Chemometrics, vol. 11, (1997) 393-401.
Van Benthem, "Application of equality constraints on variables during alternating least squares procedures," Journal of Chemometrics, vol. 16, (2002) 613-622.
Gemperline, "Advantages of Soft versus Hard Constraints in Self-Modeling Curve Resolution Problems. Alternating Least Squares with Penalty Functions." Anal. Chem. 75, (2003) 4236-4243.
Andrew, "Rapid Analysis of Raman Image Data Using Two-Way Multivariate Curve Resolution," Applied Spectroscopy, vol. 52, No. 6, (1998) 797-807.
Tauler, "Simultaneous analysis of several spectroscopic titrations with self-modeling curve resolution," Chemometrics and Intelligent Laboratory Systems, 18 (1993) 293-300.

* cited by examiner

*Primary Examiner*—David H Malzahn
(74) *Attorney, Agent, or Firm*—Kevin W. Bieg

(57) ABSTRACT

A fast combinatorial algorithm can significantly reduce the computational burden when solving general equality and inequality constrained least squares problems with large numbers of observation vectors. The combinatorial algorithm provides a mathematically rigorous solution and operates at great speed by reorganizing the calculations to take advantage of the combinatorial nature of the problems to be solved. The combinatorial algorithm exploits the structure that exists in large-scale problems in order to minimize the number of arithmetic operations required to obtain a solution.

20 Claims, 4 Drawing Sheets

| Data Set | m | n | p | $2^p$ | Initial # Unique P | Final # Unique P | # not all Passive | Overwrite | Time in seconds FC-NNLS | FNNLS | FNNLSb | % Active Variables |
|---|---|---|---|---|---|---|---|---|---|---|---|---|
| 1 | 256 | 262144 | 10 | 1024 | 624 | 727 | 232065 | 3.6 | 7.9 | 511.4 | 77.6 | 19% |
| 2 | 256 | 262144 | 8 | 256 | 223 | 229 | 211512 | 3.0 | 6.2 | 390.7 | 72.6 | 20% |
| 3 | 512 | 131072 | 6 | 64 | 53 | 54 | 74375 | 2.8 | 3.8 | 157.2 | 35.2 | 13% |
| 4 | 1024 | 65536 | 13 | 8192 | 556 | 627 | 36554 | 4.7 | 5.6 | 208.4 | 25.4 | 6% |
| 5 | 1024 | 65536 | 14 | 16384 | 689 | 777 | 37075 | 4.8 | 5.8 | 226.8 | 26.0 | 6% |
| 6 | 1024 | 65536 | 15 | 32768 | 1145 | 1347 | 47058 | 5.1 | 6.5 | 244.3 | 27.3 | 8% |
| 7 | 1024 | 16384 | 15 | 32768 | 347 | 393 | 8022 | 1.3 | 1.5 | 63.5 | 7.0 | 5% |
| 8 | 1024 | 1024 | 7 | 128 | 29 | 34 | 649 | 0.1 | 0.1 | 1.5 | 0.3 | 12% |
| 9 | 2048 | 16384 | 11 | 2048 | 171 | 188 | 7398 | 2.0 | 2.2 | 44.1 | 6.9 | 6% |
| 10 | 1012 | 16384 | 3 | 8 | 6 | 6 | 3176 | 0.6 | 0.7 | 11.0 | 4.4 | 7% |
| 11 | 2048 | 1024 | 7 | 128 | 45 | 48 | 407 | 0.1 | 0.1 | 1.6 | 0.4 | 8% |
| 12 | 57 | 37500 | 6 | 64 | 24 | 25 | 18218 | 0.1 | 0.4 | 45.4 | 9.5 | 12% |
| 13 | 1024 | 16384 | 8 | 256 | 93 | 99 | 13495 | 0.9 | 1.1 | 26.1 | 5.3 | 18% |
| 14 | 1024 | 16384 | 5 | 32 | 22 | 23 | 5945 | 0.7 | 0.8 | 17.7 | 4.7 | 9% |
| 15 | 1024 | 16384 | 7 | 128 | 96 | 99 | 7865 | 0.8 | 1.0 | 24.3 | 5.1 | 11% |

FIG. 3

FAST COMBINATORIAL ALGORITHM FOR THE SOLUTION OF LINEARLY CONSTRAINED LEAST SQUARES PROBLEMS

CROSS-REFERENCE TO RELATED APPLICATIONS

This application claims the benefit of U.S. Provisional Application No. 60/501,879, filed Sep. 9, 2003, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to methods to solve least squares problems and, in particular, to a fast combinatorial algorithm for the solution of linearly constrained least squares problems.

BACKGROUND OF THE INVENTION

Algorithms for multivariate image analysis and other large-scale applications of multivariate curve resolution (MCR) typically employ iterative, linearly constrained alternating least squares (ALS) algorithms in their solution. The efficiency with which the original problem can be solved, therefore, rests heavily on the underlying constrained least squares solver. Efficiency of solution is particularly important with large-scale MCR applications. In this context, the term "large-scale" can be used to denote problems in which the number of observation vectors is much greater than the number of variables to be estimated from each observation. A typical spectral imaging application, for instance, might require that a complete spectrum be measured at each pixel in a spatial array of a large number (e.g., of order $10^6$) of total pixels in order to estimate the concentrations of a modest number (e.g., of order 10) of chemical components at each pixel. A least squares problem having multiple observation vectors is denoted herein as a multiple right hand side (RHS) problem. See, e.g., P. Kotula and M. Keenan, "Automated analysis of SEM X-ray spectral images: A powerful new microanalysis tool," *Microsc. Microanal.* 9, 1 (2003); U.S. Pat. No. 6,584,413 to Keenan and Kotula; and U.S. Pat. No. 6,675,106 to Keenan and Kotula. Descriptions of the current state-of-the-art for solving constrained least squares problems in chemical applications can be found in the literature. See, e.g., C. L. Lawson and R. J. Hanson, *Solving Least Square Problems*, Prentice-Hall, Inc., Englewood Cliffs, N.J. (1974); A. Bjorck, Numerical Methods for Least Squares Problems, SIAM, Philadelphia (1995); R. Bro and S. DeJong, "A fast non-negativity-constrained least squares algorithm," *J. Chemometrics* 11, 393 (1997); and M. Van Benthem et al., "Application of equality constraints on variables during alternating least squares procedures," *J. Chemometrics* 16, 613 (2002).

Given its fundamental role in solving a variety of linearly constrained optimization problems, much attention has been paid to methods for estimating least squares models subject to non-negativity constraints in particular. The method of non-negativity constrained least squares (NNLS) is an important tool in the chemometrician's toolbox. Often, it is used in ALS algorithms when the variables to be estimated are known to be non-negative (such as fluorescence spectra or chemical concentrations). The simplest way to implement these non-negativity constraints is to solve the corresponding unconstrained least squares problem and then overwrite any negative values with zeros. Unfortunately, this overwriting method does not employ an appropriate least squares criterion so one is left with a solution that has ill-defined mathematical properties. ALS algorithms based on the overwriting method, for instance, do not necessarily lower the cost function on successive iterations and, therefore, are not guaranteed to converge to a least squares minimum. Fortunately, there exist methods that solve the NNLS problems in a mathematically rigorous fashion. These methods impose non-negativity on the solution while minimizing the sum of squared residuals between the data being fit and their estimates in a true least-squares sense.

While rigorous methods ensure true least squares solutions that satisfy the non-negativity constraints, they can be computationally slow and demanding. In addition, rigorous methods are more difficult to program than the simple overwriting method. These are probably the principal reasons many practitioners of techniques that employ NNLS choose not to use rigorous methods. The standard NNLS algorithm originally presented by Lawson and Hanson was designed to solve the NNLS problem for the case of a single vector of observations. See Lawson and Hanson, Chapter 23. When applied in a straightforward manner to large-scale, multiple RHS problems, however, performance of the standard NNLS algorithm is found to be unacceptably slow owing to the need to perform a full pseudoinverse calculation for each observation vector. Bro made a substantial speed improvement to the standard NNLS algorithm for the multiple RHS case. Bro's fundamental realization was that large parts of the pseudoinverse could be computed once but used repeatedly. Specifically, his algorithm precomputes the cross-product matrices that appear in the normal equations formulation of the least squares problem. Bro also observed that, during ALS procedures, solutions tend to change only slightly from iteration to iteration. In an extension to his NNLS algorithm that he characterized as being for "advanced users," Bro retained information about the previous iteration's solution and was able to extract further performance improvements in ALS applications that employ NNLS. These innovations led to a substantial performance increase when analyzing large multivariate, multi-way data sets. However, even with Bro's improvements, a need remains for further performance improvements and for a fast algorithm that has general applicability to the solution of linearly constrained, multiple RHS least squares problems.

The present invention is directed to a fast combinatorial algorithm that has improved performance compared to prior algorithms for solving linearly constrained least squares problems. The combinatorial algorithm exploits the structure that exists in large-scale problems in order to minimize the number of arithmetic operations required to obtain a solution. Based on combinatorial reasoning, this algorithm rearranges the calculations typical of standard solution methods. This rearrangement serves to reduce substantially the amount of computation required in a typical MCR problem. The combinatorial algorithm has general applicability for solving least squares problems subject to a wide variety of equality and inequality constraints.

The application of the combinatorial algorithm to the solution of the NNLS problem is described herein in detail. The combinatorial algorithm has been tested by performing calculations that are typical of ALS applications on spectral image data. The spectral image data sets varied widely in size and, in all cases, the combinatorial algorithm outperforms both Bro's simple and advanced-user modes, and it does so without the attendant overhead required in the latter case. Using the overwriting method as a point of reference, the combinatorial algorithm also exhibits much better scaling behavior for problems with very large (e.g., greater than $10^5$) numbers of RHS vectors.

SUMMARY OF THE INVENTION

The present invention is directed to a fast combinatorial algorithm for the solution of linearly constrained least squares problems. The fast combinatorial algorithm can be used to solve both least squares problems subject to either equality or inequality constraints.

For solving a multiple right-hand-side least squares problem $AX=B$, subject to a set of equality constraints $E_j X_j = F_j$, $j=1, 2, \ldots, n$, the fast combinatorial algorithm comprises: a) computing constant parts of the pseudoinverse of A; b) partitioning the column indices C of B into q column subsets $C_k$ corresponding to q unique constraint matrices $E_k$, $k=1, 2, \ldots, q$; c) choosing a column subset $Q$ to be a particular subset $C_k$ corresponding to a $k^{th}$ unique constraint that has not yet been solved; d) forming a general set of linear equations using the constant parts of the pseudoinverse and the constraint matrices $E_k$ and $F_k$ for the column subset $Q$; e) factoring the coefficient matrix of the general set of linear equations to provide an equivalent triangular set of linear equations; f) solving the triangular set of linear equations for the $j^{th}$ column vector of X for a j in the column subset Q; g) repeating step f) until all column vectors of X corresponding to the column subset $Q$ have been solved for; and h) repeating steps c) through g) for a next column subset $Q$ until all q column subsets have been solved for, thereby providing a solution matrix $\hat{X}$.

For solving a multiple right-hand-side least squares problem $AX=B$, subject to an inequality constraint $CX \geq D$, the fast combinatorial algorithm comprises: a) computing the constant parts of the pseudoinverse of A; b) choosing an initial feasible solution for X and, for each column of X, partitioning the row indices into a passive set $\mathcal{P}$, containing the sets of the indices of the variables that are unconstrained, and an active set $\mathcal{A}$, containing the sets of the indices of variables that are constrained to equal the boundary value; c) putting the column indices of the initial feasible solution that are not known to be optimal into a column set C, thereby providing a passive set $\mathcal{P}_C$ and a complementary active set $\mathcal{A}_C$; d) solving for $X_C$ combinatorially according to $AX_C=B_C$, subject to $\mathcal{A}_C X_C=0$, for the variables represented in the current passive set $\mathcal{P}_C$; e) identifying any infeasible solution vectors in $X_C$, putting their column indices in an infeasible set I, and making them feasible by moving variables from an infeasible passive set $\mathcal{P}_I$ to a complementary active set $\mathcal{A}_I$; f) solving for $X_I$ combinatorially according to $AX_I=B_I$, subject to $\mathcal{A}_I X_I=0$, for the variables represented in the infeasible passive set $\mathcal{P}_I$; g) repeating steps e) through f) until no infeasible solution vectors are obtained, thereby providing a current feasible solution $X_C$; h) identifying any solution vectors $X_j$ that are not optimal and removing their column indices j from the column set C, thereby providing a new column set C representing solution vectors that are not optimal; i) for each column index j in column set C, moving a variable from the active set $\mathcal{A}_j$ to the passive set $\mathcal{P}_j$ for each non-optimal solution vector $x_j$, thereby providing a new passive set $\mathcal{P}_C$ and new complementary active set $\mathcal{A}_C$; and j) repeating steps d) through i) until all solution vectors $x_j$ are optimal, thereby providing a solution matrix $\hat{X}$.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 3 shows a table that summarizes the performance of NNLS algorithms on 15 data sets.

DETAILED DESCRIPTION OF THE INVENTION

Figure 1:
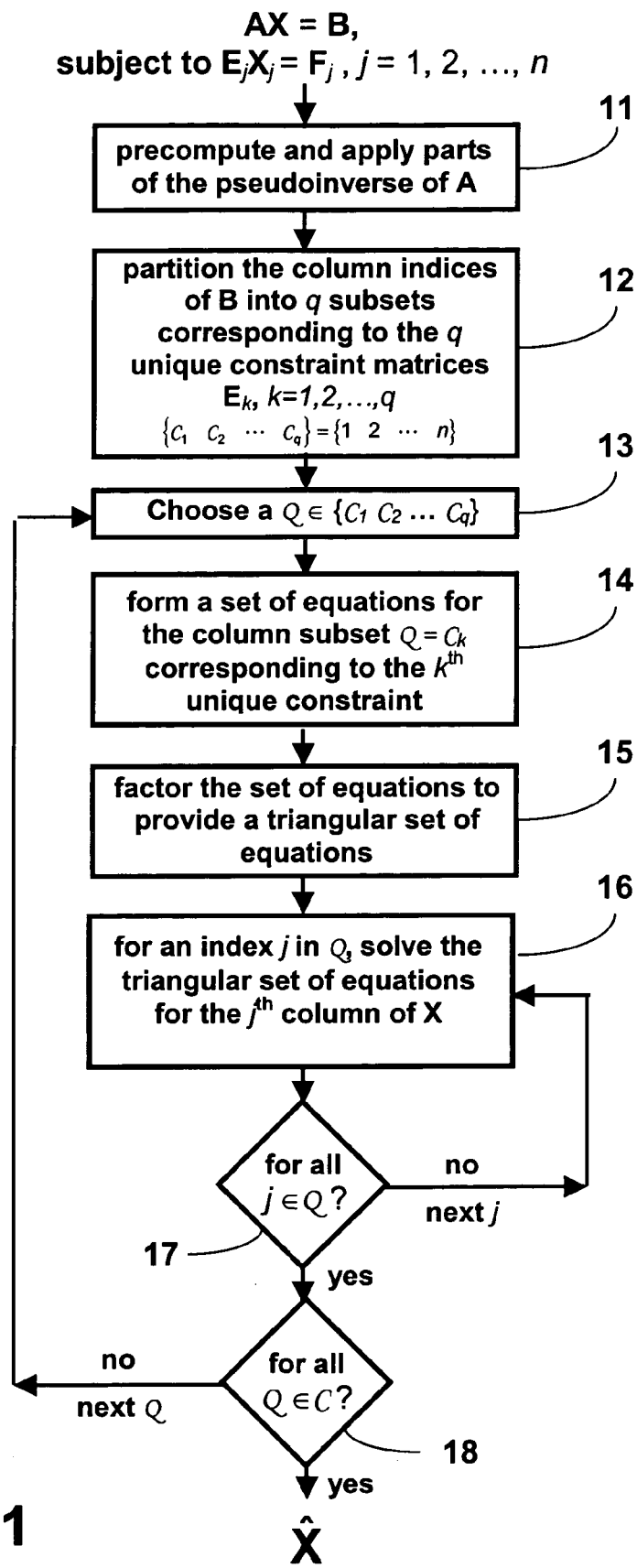
FIG. 1 shows a fast combinatorial algorithm for the solution of an equality constrained least squares problem.

Notation herein is typical of this type of work: scalars are lowercase italics, column vectors are lowercase bold, matrices are uppercase bold, and transposes of vectors (i.e., row vectors) and matrices are indicated by a superscript T. Columns of matrices are depicted using lowercase bold with a dot-index subscript, e.g., column one of matrix A is the column vector $a_{\cdot 1}$. Rows of matrices are depicted using lowercase bold with an index-dot subscript, e.g., row one of matrix A is the row vector $a_{1 \cdot}$ (note that it is not shown as a transpose). Prepended superscripts represent the ordinal in a series of iterations. Sets of indices are represented with fancy type, e.g., $\mathcal{P}$ and sets containing sets of indices by the bolded fancy type, e.g., $\boldsymbol{\mathcal{P}}$. Finally, submatrices are represented as pre- and/or post-subscripted bolded capital letters. Thus, $_{\mathcal{A}}X_C$ is the submatrix of X comprising the rows whose indices are in the sets $\mathcal{A}$ and columns whose indices are in the set C.

General Linearly Constrained Least Squares Problem

The general, linearly constrained linear model for a single vector of observations (or single RHS) can be defined as:

$Ax=b$ satisfying the constraints:

$Cx \leq d$ $Ex=f$              (1)

The p-vector x holds the p model parameters that will be estimated during the least squares process, and b is an m-vector of observations. A is an m×p data matrix that expresses the linear relationship between the p model parameters and the m individual observations. In a spectral imaging application, b might be the m-channel spectrum observed at a single pixel. Then, A is a matrix whose columns represent the pure-component spectra of the p chemical species that constitute the sample and we wish to estimate x, the concentrations of the respective pure components in the given pixel. The linear inequality constraints are described by the entities C and d, and the equality constraints by E and f. These constraints are used to limit possible solutions to those that are physically acceptable. Non-negativity of species concentrations and spectral emission intensities are typical examples of inequality conditions that must be met by solutions that conform to physical reality. A, together with the system of constraints, defines the structure and limits of the data model.

Solving the Unconstrained Least Squares Problem for a Single RHS

Consider first the solution to the least squares problem having a single RHS. According to the least squares model, the vector of unknown model parameters x is typically estimated by finding that value of x, $\hat{x}$, that minimizes the sum of the squared differences between the model predictions $\hat{b}=A\hat{x}$ and the observations b, namely, $$\sum_{i=1}^{m}(\hat{b}_i - b_i)^2.$$

In matrix notation, this becomes:

$$\hat{x} = \min_{x}\|Ax - b\|_2^2 \text{ subject to constraints on } x \quad (2)$$

As will be discussed later, a constrained least squares problem can be recast in terms of a sequence of unconstrained problems, thus the procedure for solving the unconstrained least squares problem is of fundamental importance and will be reviewed briefly. The unconstrained least squares solution to Eq. (1) can be written as:

$$\hat{x}=A^+b \quad (3)$$

where $A^+$ is the pseudoinverse of A. The pseudoinverse can be computed in a variety of ways. Perhaps the most familiar computation to chemometricians is the normal equations, the first step of which is the formation of the cross-products by left multiplication of Eq. (1) by the transpose of A $$A^TAx=A^Tb \quad (4)$$

Therefore, a commonly employed algorithm for obtaining the least squares estimate of $\hat{x}$ in the unconstrained case is to solve the normal equations:

Compute $A^TA$

Compute $A^Tb$

Solve for x, the set of equations $A^TAx=A^Tb$ (5)

It will be important to note that the matrix of coefficients $A^TA$ only involves the structure of the model, whereas the RHS $A^Tb$ involves both the model structure and the observations specific to a given experiment. x can then be solved for using various techniques known to those with skill in the art.

The fact that $A^TA$ is known to be a symmetric positive definite matrix allows some additional numerical improvements. $A^TA$ can be factored using the Cholesky decomposition to yield two triangular systems of equations that are readily solved by standard means. See G. H. Golub and C. F. Van Loan, *Matrix Computations*, 3$^{rd}$ Ed., The Johns Hopkins University Press, Baltimore (1996). The solution algorithm can then be written:

Compute $G=chol(A^TA)$

Compute $A^Tb$

Solve for x, the triangular sets of equations:

$G^Ty=A^Tb$ $Gx=y$ (6)

An alternative method of solution makes use of an orthogonal factorization of the data matrix A. The least squares solution algorithm when the "thin" QR factorization is employed can be written Compute the QR factorization: A=QR Compute $Q^Tb$ Solve for x, the triangular set of equations: $Rx=Q^Tb$ (7)

In this formulation, Q is an m×p matrix having orthonormal columns and R is upper triangular. Not surprisingly, there is a close connection between these two methods. The Cholesky factor G, for instance, is equal to the QR factor R. In the remainder of this description, only the normal equations approach to solving least squares problems will be used. It will be recognized, however, that the combinatorial algorithm of the present invention does not depend on the details of the normal equations method and that other methods for solving unconstrained least squares problems could be used with equal effect. The details of the foregoing methods, as well as several others, are available in the references of Bjorck, Bro, and elsewhere.

Solving the Unconstrained Least Squares Problem with Multiple RHS Now, consider the solution to the least squares problem having a multiple RHS, wherein the number of columns of observations is greater than one. In the case of multiple observation vectors $b_{\cdot j}$ multiple solution vectors $\hat{x}_{\cdot j}$ can be estimated. The general, the linearly constrained least squares model can be conveniently written in matrix terms as:

AX=B satisfying the constraints:

CX≧D

EX=F where:

$B=[b_{\cdot 1} \, b_{\cdot 2} \ldots b_{\cdot n}]$ $X=[x_{\cdot 1} \, x_{\cdot 2} \ldots x_{\cdot n}]$, etc. (8)

where n is the number of RHS vectors. As before, the goal is to minimize the sum of the squared residuals, now $$\sum_{j=1}^{n}\sum_{i=1}^{m}(\hat{b}_{ij} - b_{ij})^2 \equiv \|\hat{B} - B\|_F^2,$$

which is the Frobenius norm of the residuals matrix. This can be accomplished by solving $$\hat{X} = \min_{x}\|AX - B\|_F^2 = \sum_{j=1}^{n} \min_{x_{\bullet j}}\|Ax_{\bullet j} - b_{\bullet j}\|_2^2 \quad (9)$$

subject to the constraints

Thus, the solution $\hat{X}$ for the multiple RHS case is obtained one column at a time by solving a series of single RHS problems. For the unconstrained case, the obvious algorithm for computing $\hat{X}$ is simply an extension of single RHS Algorithm (5):

For j=1:n

Compute $A^T A$

Compute $A^T b_{\cdot j}$

Solve for $x_j$, the set of equations $A^T A x_j = A^T b_{\cdot j}$ end     (10)

Using one data set (data set 15 in Table I) with p=7, m=1024 and n=16384, Algorithm (10) runs in 12.3 seconds using Matlab Version 7 on a 1 GHz Pentium III-based computer. This algorithm clearly requires excessive computation. However, the speed of the computation can be improved. In particular, it is noted that (1) $A^T A$ doesn't depend on the column j so its computation can be moved outside of the loop, and (2) that $A^T b_{\cdot j}$ is just the $j^{th}$ column of $A^T B$ so the matrix-matrix multiplication can also be performed outside of the loop according to a revised algorithm:

Compute $A^T A$

Compute $A^T B$

For j=1:n

Solve for $x_j$, the set of equations $A^T A x_j = (A^T B)_{\cdot j}$ end     (11)

The revised Algorithm (11) runs in 2.3 seconds for the same data set on the same computer. Finally, solving the sets of linear equations requires the factorization of $A^T A$, which can also be accomplished outside of the loop. Employing the Cholesky factorization, the revised algorithm becomes:

Compute $G = chol(A^T A)$

Compute $A^T B$

For j=1:n

Solve for $x_j$, the triangular sets of equations:

$G^T y = (A^T B)_{\cdot j}$ $G x_j = y$ end     (11)

The revised Algorithm (12) requires 1.5 seconds to run. Of course, these efficiencies are well known in the art. Indeed, these efficiencies are built-in to the Matlab function which, including additional loop optimizations, can solve the current problem in 0.8 second.

The reason that $A^T A$ (and its factorization) can be moved outside of the loop is that each individual single RHS problem has exactly the same structure as defined by the data matrix A, as noted previously. Therefore, the common structural factor $A^T A$ can be computed once and a simpler calculation on each individual column can subsequently be performed to obtain the final solution of an unconstrained problem.

This commonality of structure is the key insight that leads to the "combinatorial approach" of the present invention to solving constrained least squares problems. In more complex, constrained least squares minimization problems, the problem structures may not be the same for all RHS and, as with active/passive set algorithms, may even evolve as the solution proceeds. However, if at any point in the algorithm the number of unique problem structures reflected in A and the constraints is much less than the number columns that are to be solved, computational efficiency can be achieved by grouping together and solving all subproblems having like structure. In the following discussion, the combinatorial approach will be developed in several simple examples of equality and inequality constrained least squares problems. Finally, a combinatorial algorithm will be described for the problem NNLS in detail.

Equality Constraints by Weighting

A common approach to the solution of equality constrained least squares problems is the method of weighting. Consider the solution to the problem:

AX=B subject to the constraints:

$E_j x_{\cdot j} = f_{\cdot j}, j = 1:n$ (13)

where the structure of the constraints, namely, E, can vary from column to column of B. The solution for the $j^{th}$ single column of B is formulated as:

$$\begin{bmatrix} A \\ \gamma E_j \end{bmatrix} x_{\bullet j} = \begin{bmatrix} b_{\bullet j} \\ \gamma f_{\bullet j} \end{bmatrix}; \gamma \text{ is a large constant} \quad (14)$$

The normal equations, in this case, can be written as:

$(A^T A + \gamma^2 E_j^T E_j) x_{\cdot j} = A^T b_{\cdot j} + \gamma^2 E_j^T f_j$ (15)

The problem structure factor $A^T A + \gamma^2 E_j^T E_j$ will, in principle, vary from column to column of B. Thus, for the most general case, the solution algorithm for the least squares problem with weighted equality constraints is similar to the Algorithm (11):

Compute $A^T A$

Compute $A^T B$

For j=1:n

Solve for $x_j$, the set of equations:

$(A^T A + \gamma^2 E_j^T E_j) x_{\cdot j} = (A^T B)_{\cdot j} + \gamma^2 E_j^T f_j$ end     (16)

Obviously, this algorithm will require n factorizations of $A^T A + \gamma^2 E_j^T E_j$. However, if the number of unique constraint matrices is less than the number of RHS, some computational efficiency can be achieved using the combinatorial approach.

A closure constraint is an example of an equality constraint. The closure constraint is also known as the "sum-toone" constraint. It may arise, for instance, in describing the relative concentrations of reacting species in a closed chemical system. To apply closure, $E^T$ is a p-vector of ones $1_p$ and $F^T$ is an n-vector of ones $1_n$. Since E is independent of the column index, computations involving E can be moved outside of the loop to yield the analog of Algorithm (12), which requires only a single matrix factorization:

Compute $G=chol(A^TA+\gamma^2 1_p 1_p^T)$

Compute $H=A^TB+\gamma_p^2 1_p 1_n^T$

For j=1:n

Solve for $x_j$, the triangular sets of equations:

$G^T y = h_j$ $Gx_j = y$ end (17)

Another example of an equality constraint is the variable equality problem. In the variable equality problem, certain variables are constrained to equal a known value and the set of variables to be constrained may vary from column to column. For the case of simple variable equality, $E_j$ is a k×p selection matrix where k is the number of the p total variables that are to be constrained in the $j^{th}$ column. The complete structure of the constraint matrix can be concisely represented by a p×n matrix V. If the $i^{th}$ variable in the $j^{th}$ column of X is to be constrained, $v_{ij}=1$, otherwise, $v_{ij}=0$. In this representation, $E_j^T E_j = diag(v_{.j})$ and $E_j^T f_j = \tilde{f}_j$. The application of $E_j^T$ in the latter expression transforms the k-vector $f_j$ into a p-vector $\tilde{f}_j$ where $v_{.j}$ indexes the locations of the original k variables and the remaining elements are zero. Straightforward application of Algorithm (16) yields:

Compute $A^TA$

Compute $A^TB$

For j=1:n

Solve for $x_j$, the set of equations:

$(A^TA+\gamma^2 diag(v_{.j}))x_j=(A^TB)_{.j}+\gamma^2 \tilde{f}_j$ end (18)

It is at this point that the combinatorial approach of the present invention provides a performance improvement for the solution of large-scale problems. Given p total variables, there are at most $2^p$ unique combinations of variables that can be constrained and, in practical applications, there are often many times fewer. If q is the number of unique constraint matrices $E_k$ (or equivalently, $v_{.k}$), where k=1, 2, ..., q, and q<<n, then multiple RHS problems necessarily share a common constraint structure and the corresponding factorizations can be moved out of the loop. Letting $C_k$ be the set of column indices having the $k^{th}$ unique constraint matrix in common, it is noted that $\{C_1 C_2 \ldots C_q\} = \{1\ 2 \ldots n\}$ (19)

This partitioning into q unique constraint matrices enables Algorithm (18) to be rewritten as a combinatorial algorithm:

Compute $A^TA$

Compute $A^TB$

Compute the column partition $\{C_1 C_2 \ldots C_q\} = C$

For all $Q \in C$

Compute $G=chol(A^TA+\gamma^2 diag(v Q))$

Compute $H=(A^TB)Q+\gamma^2 \tilde{F}Q$

For all $j \in Q$

Solve for $x_j$, the triangular sets of equations:

$G^T y = h_j$ $Gx_j = y$ end end (20)

where $vQ$ is the representation of the common constraint for the column subset $Q$.

The combinatorial Algorithm (20) for solving equality constrained least squares problems requires q matrix factorizations as compared to the n factorizations needed by prior Algorithm (18). The remaining need for the optimization of the combinatorial algorithm is for an efficient method for partitioning the column indices into the sets having common constraints.

Algorithm for Column Partitioning

An algorithm for partitioning a logical matrix into column sets having equal columns is, perhaps, best illustrated by example. In the foregoing discussion, the matrix V was used to indicate which variables were to be equality constrained. Matrix (21) is a 16 RHS example where a small fraction of the variables are to be constrained, as indicated by a one. Note that each column of V can be thought of as the binary representation of a decimal integer. The Vector (22) gives the decimal equivalent of each column, which is obtained by multiplying each column of V by the row vector [4 2 1].

$$V = \begin{bmatrix} 1 & 0 & 0 & 0 & 1 & 0 & 0 & 0 & 0 & 0 & 1 & 1 & 0 & 0 & 0 \\ 0 & 1 & 0 & 0 & 0 & 1 & 1 & 1 & 0 & 0 & 0 & 0 & 1 & 0 & 0 \\ 0 & 1 & 1 & 1 & 0 & 1 & 0 & 0 & 0 & 0 & 0 & 0 & 0 & 1 & 0 \end{bmatrix}$$ (21)

code=[4 3 1 1 4 3 2 2 0 0 0 4 4 2 1 0] (22)

The code (Vector (22)) can then be sorted and the column indices permuted accordingly. The results are shown in Vectors (23) and (24).

sorted code=[0 0 0 0 1 1 1 2 2 2 3 3 4 4 4 4] (23)

indices=[9 10 11 16 3 4 15 7 8 14 2 6 1 5 12 13] (24)

Subtracting a circularly shifted copy (Vector (25)) of the sorted code (Vector (23)) from the sorted code provides the shifted difference code (Vector (26))

shifted code=[4 0 0 0 0 1 1 1 2 2 2 3 3 4 4 4] (25)

shifted diff=[−4 0 0 0 1 0 0 1 0 0 1 0 1 0 0 0] (26)

Vector (26) has the following properties: (a) the number of non-zero elements is equal to the number of unique vectors contained in the original matrix, (b) the locations of the non-zero elements are pointers to the start of each column index set in the permuted indices vector, and (c) the locations of the non-zero elements are pointers to the binary code for each of the respective column sets. Thus, for this example, there are q=5 unique columns out of n=16 total, and the unique column index sets are $$C_1=\{9\ 10\ 11\ 16\}, C_2=\{3\ 4\ 15\}, C_3=\{7\ 8\ 14\}, C_4=\{2\ 6\}, C_5=\{1\ 5\ 12\ 13\} \quad (27)$$

with $$v_{C_1} = \begin{bmatrix} 0 \\ 0 \\ 0 \end{bmatrix}, v_{C_2} = \begin{bmatrix} 0 \\ 0 \\ 1 \end{bmatrix}, v_{C_3} = \begin{bmatrix} 0 \\ 1 \\ 0 \end{bmatrix}, v_{C_4} = \begin{bmatrix} 0 \\ 1 \\ 1 \end{bmatrix}, \text{ and } v_{C_5} = \begin{bmatrix} 1 \\ 0 \\ 0 \end{bmatrix} \quad (28)$$

A sample Matlab code that implements this column partitioning algorithm, and which accounts for the special case that all columns are equal, is shown below:

```
function [ColumnSet, StartIndices] = ColumnPartition(V)
  [nVars, nRHS] = size(V);
  [code, ColumnSet] = sort (2.^(nVars−1:−1:0)*V );
  if code(1) == code(end)
    StartIndices = 1;
  else
    StartIndices = find(code−circshift(code, [0 1]));
  end
```

While Matlab utilizes a version of Quicksort, other sorting algorithms can be used as well. A particularly efficient choice for the case that there are relatively few variables, e.g., $2^p<n$, is based on the counting sort algorithm, which is described in T. H. Cormen et al., *Introduction to Algorithms*, $2^{nd}$ Ed., MIT Press, Cambridge, Mass. (2001).

Variable Equality Constraints by Direct Elimination

As in the previous example, consider a simple variable equality such that the matrix $E_j$ is a k×p selection matrix where k is the number of the p total variables that are to be constrained in the $j^{th}$ column. A p−k×p selection matrix $U_j$ can be defined that selects the variables that are unconstrained in the $j^{th}$ column. The matrix P given by:

$$P_j = \begin{bmatrix} U_j \\ E_j \end{bmatrix} \quad (29)$$

P is then a permutation matrix that partitions the variables into a set that is constrained to equal known values and a set that will be estimated by least squares. The least squares problem for the $j^{th}$ column then becomes $$Ax_{\bullet j} = AP^T P x_{\bullet j} = [AU_j^T AE_j^T] \begin{bmatrix} U_j x_{\bullet j} \\ E_j x_{\bullet j} \end{bmatrix} = AU_j^T U x_{\bullet j} + AE_j^T E x_{\bullet j} = b_{\bullet j} \quad (30)$$

Imposing the equality constraint $Ex_{\bullet j}=f_{\bullet j}$ and rearranging yields $$AU_j^T U_j x_{\bullet j} = b_j - AE_j^T f_j \quad (31)$$

and the normal equations that are satisfied by the solution are:

$$U_j^T A^T AU_j^T U_j x_{\bullet j} = U_j^T A^T b_j - U_j^T A^T AE_j^T f_j \quad (32)$$

As before, the sets of free and constrained variables can be represented by a logical matrix V. In this case, if the $i^{th}$ variable in the $j^{th}$ column of X is to be unconstrained, $v_{ij}=1$, otherwise, $v_{ij}=0$. Note that the set of variables that are to be constrained is simply the complement of $v_j$, $v_j^c$. The normal equations formulation for the solution of the unknown variables $_{v_j}x_j$ is then:

$$v_j(A^T A)_{v_j v_j} x_{\bullet j} = v_j(A^T B)_{\bullet j} - v_j(A^T A)_{v_j v_j^c} x_{\bullet j} \quad (33)$$

An efficient solution algorithm that makes use of the combinatorial approach can now be easily designed by grouping columns having like $v_j$ as in Eq. (19). The resulting combinatorial algorithm is:

compute $A^T A$ compute $A^T B$ compute the column partition $\{C_1\ C_2 \ldots C_q\}=C$ for all $Q \in C$ compute $G = chol(_{v_Q}(A^T A)_{v_Q})$
  compute $H = {_{v_Q}}(A^T B)_Q - {_{v_Q}}(A^T A)_{v_Q v_Q^c} X_Q$ for all $j \in Q$ solve
    $G^T y = h_{\bullet j}$
    $G_{v_Q} x_{\bullet j} = y$ end for end for Note that in the important case that all of the constrained variables are constrained to equal zero, the second term in the computation of H vanishes.

In FIG. 1 is shown a flow diagram of a generic fast combinatorial algorithm for solution of an equality constrained least squares problem. It is desired to solve the multiple right-hand-side least squares problem AX=B, subject to a set of equality constraints, $E_j X_j=F_j$, where j=1, 2, ..., n.

At step 11, the constant parts of the pseudoinverse of A (e.g., $A^T A$ and $A^T B$, or R and $Q^T B$) are precomputed.

At step 12, column indices C of B are partitioned into q subsets corresponding to q unique constraint matrices $E_k$ (or equivalently, $V_{\bullet k}$), where k=1, 2, ..., q. $C_k$ is the set of column indices having the $k^{th}$ unique constraint in common, according to Eq. (19). A vector representation, vQ for a column subset Q having the $k^{th}$ unique constraint can be obtained using an algorithm for column partitioning (e.g., Eqs. (21)-(28)).

At step 13, a column subset Q corresponding to a $k^{th}$ unique constraint is chosen from the set of column indices, according to $Q \in \{C_1\ C_2 \ldots C_q\}$. Therefore, Q is chosen to be a particular subset $C_k$ that has not yet been solved.

At step 14, a general set of linear equations is formed using the constant parts of the pseudoinverse and the constraint matrices $E_k$ and $F_k$ for the column subset Q. The general set of linear equations is dependent on the problem type. For example, to solve the problem of variable equality constraints by direct elimination, the general set of linear equations can comprise the coefficient matrix $$M = {}_{v_Q}(A^T A)_{v_Q}$$

and right-hand-side $$H = {}_{v_Q}(A^T B)_Q - {}_{v_Q}(A^T A)_{v_Q^C v_Q^C} X_Q,$$

according to Eq. (33).

At step 15, the coefficient matrix of the general set of linear equations is factored to provide an equivalent triangular set of linear equations for the column subset $Q$. The factorization method used depends on the solution process. For example, if a Cholesky factorization of the general equations is used to provide the triangular set of linear equations, the Cholesky factor is G=chol(M), according to Algorithm (34).

At step 16, the solution vector $x_{\cdot j}$ for the $j^{th}$ column of X is solved for using the triangular set of linear equations for the column subset $Q$. For example, if the triangular set of linear equations are obtained from a Cholesky factorization, the $j^{th}$ column vector of X can be obtained by solving the triangular set of linear equations $$G^T y = h_{\bullet j} \text{ and } G_{v_Q} x_{\bullet j} = y,$$

according to Algorithm (34).

At step 17, if all of the $x_{\cdot j}$ have been solved for corresponding to all j columns of X in the column subset $Q$, the algorithm proceeds to step 18. If all of the solution vectors in the column subset $Q$ have not been solved for, the algorithm returns to step 16 and the next column j of X in the column subset $Q$ is solved for.

At step 18, after all j of the columns for the column subset $Q$ have been solved for, the algorithm returns to step 13. At step 13, another column subset $Q$ is chosen, corresponding to another unique constraint k. For relatively large p, if may be advantageous to sort the various sets of column indices and solve them in optimized order, as described in the Further Improvements section below. Steps 14 through 17 are then repeated until solution vectors have been obtained for all of the q column subsets $Q$ of column indices in C, thereby providing the solution matrix $\hat{X}$.

Evolving Constraints Active Set Algorithms for Linear Inequality Constraints Now consider the solution of the least squares problem with inequality constraints. In general, inequality constraints define a feasible region in multidimensional space. At the least squares minimum, variables either will reside in the interior of the feasible region or will be found on the boundary. The passive set comprises those variables that are interior to the feasible region, and the active set, those on the boundary. If it were known, a priori, the active set for the optimal solution, the solution to the inequality constrained least squares problem could be obtained as the solution to the equality constrained problem with all active variables being constrained to be equal to their boundary values. The active/passive set strategy for solving inequality constrained least squares problems, then, is to iteratively move variables between the active and passive sets, typically one at a time, in such a way that the cost function steadily decreases and feasibility of the solution is maintained. Since there are a limited number of ways to partition variables between the active and passive sets, convergence of this process is guaranteed.

A generic active/passive set algorithm for the case that there are n multiple independent RHS vectors is:

initialize X, $\mathcal{P}$ and $\mathcal{A}$ to be feasible for j=1:n k=0 while $x_{\cdot j}$ is not optimal $[x_{\cdot j}\, \mathcal{P}_j\, \mathcal{A}_j]_{k+1} = f([x_{\cdot j}\, \mathcal{P}_j\, \mathcal{A}_j]_k)$ k=k+1 end while end for                   (35)

The elements of the active ($\mathcal{A}$) and passive ($\mathcal{P}$) sets are subsets that index the rows of X. The variables in X that are indexed in $\mathcal{P}$ are those that are solved for in an unconstrained least squares sense. $\mathcal{A}$ is merely the complement of $\mathcal{P}$ and it contains the indices of variables that are constrained to the boundary value. The challenge resides in selecting variables to assign to one set or the other. The function $f$ embodies the details of how variables are moved between the active and passive sets, and how the solution vectors are updated from the $k^{th}$ iteration to the $k+1^{st}$ iteration. This function is problem-dependent but might be a single iteration of Lawson and Hanson's NNLS algorithm, for instance. No matter what the other details of $f$ are, at some point an unconstrained least squares solution for the passive variables, that is, a subset of $x_{\cdot j}$, will be computed. In general, this subset will differ from column to column, and will necessarily differ from iteration to iteration. Since the optimization is performed for each column of X in a serial fashion, this approach can be termed column-serial.

As the first step toward grouping, or partitioning, like problems to take advantage of the combinatorial approach, it is observed that the two loops in Algorithm (35) can be interchanged. That is, rather than performing all iterations for each column in series, we can perform the $k^{th}$ iteration for all columns corresponding to non-optimal solutions in parallel:

initialize X, $\mathcal{P}$ and $\mathcal{A}$ to be feasible initialize C={1 2 ... n} k=0 while C≠∅ for all j∈C $[x_{\cdot j}\, \mathcal{P}_j\, \mathcal{A}_j]_{k+1} = f([x_{\cdot j}\, \mathcal{P}_j\, \mathcal{A}_j]_k)$    (36)

if $x_{\cdot j}$ is optimal, remove index j from C end for k=k+1 end while

Using the combinatorial approach of the present invention, the RHS columns can be partitioned corresponding to like passive sets at the points(s) in the algorithm that the passive variables need to be solved for. Therefore, this approach can be termed column-parallel. Using this column-parallel approach in a fast combinatorial algorithm significantly reduces the computational burden, as described above. Again, the details are problem-dependent.

Non-negativity Constrained Least Squares: Problem NNLS

Problem NNLS is used to illustrate this combinatorial, column-parallel approach. A high level description of Lawson and Hanson's approach to Problem NNLS for a single RHS is:

initialize x, $\mathcal{P}$ and $\mathcal{A}$ to be feasible while x is not the optimal solution solve Ax=b subject to $\mathcal{A}$x=0 while any $\mathcal{P}$x<0 make x feasible (move variables from $\mathcal{P} \to \mathcal{A}$)

solve Ax=b subject to $\mathcal{A}$x=0 end while if x is not optimal move a variable from $\mathcal{A} \to \mathcal{P}$ end if end while     (37)

The standard NNLS Algorithm (37) simply fills in the relevant details for the function ƒ in Algorithm (35) and is appropriate to the single RHS problem. Note that the solution to the inequality-constrained least squares problem is obtained by solving a sequence of equality-constrained problems. The details of how variables are selected to be moved between sets, optimality conditions, etc., have all been thoroughly described in the references of Lawson and Hanson, Bro, and others. An example will follow that helps to clarify the differences in selecting variables to assign to the active and passive set for the standard NNLS algorithm and the combinatorial algorithm.

Fast Combinatorial NNLS Algorithm

The general column-parallel active/passive set Algorithm (36), the details of NNLS in Algorithm (37), and the efficient way to solve the equality constrained problems with Algorithm (34) or, alternatively, Algorithm (20) can be used to design an efficient fast combinatorial NNLS (FC-NNLS) algorithm for large-scale problems. In the fast combinatorial approach the columns of X whose passive sets are identical are identified, they are collected together, the appropriate pseudoinverses are computed and the passive variables are solved for. At a very basic level, the active/passive set method solves an inequality-constrained least squares problem as a sequence of equality-constrained problems. The overall FC-NNLS algorithm is responsible for defining that sequence and it does so in two ways. First, the combinatorial NNLS algorithm governs the general flow of problems in the column-serial/column-parallel sense outlined above. Second, the NNLS algorithm defines the details of each individual problem by choosing the particular passive-set variables that must be estimated at each step in the sequence. The NNLS algorithm, in turn, relies upon an unconstrained least squares solver to estimate the optimal zero-equality-constrained solution for each subproblem. The complete, integrated FC-NNLS algorithm is shown below:

compute $A^TA$ compute $A^TB$ initialize X, $\mathcal{P}$ and $\mathcal{A}$ to be feasible initialize C={1 2 ... n} while C≠Ø solve $AX_C=B_C$,subject to $\mathcal{A}_C A_C=0$,given $A^TA,(A^TB)_C, \mathcal{P}_C, \mathcal{A}_C$ set $I=\{k\epsilon C | x_{\cdot k}$ is infeasible (i.e. any element of $x_{\cdot k}<0)\}$ while I≠Ø make $X_I$ feasible (move variables from $\mathcal{P}_I \to \mathcal{A}_I$)

solve $AX_I=B_I$ subject to $\mathcal{A}_I X_I=0$,given $A^TA, (A^TB)_I, \mathcal{P}_I, \mathcal{A}_I$ set $I=\{k\epsilon C | x_{\cdot k}$ is infeasible$\}$ end while for all jεC if $x_j$ is optimal remove index j from C else move a variable from $\mathcal{A}_j \to \mathcal{P}_j$ end if e end for end while     (38)

Figure 2:
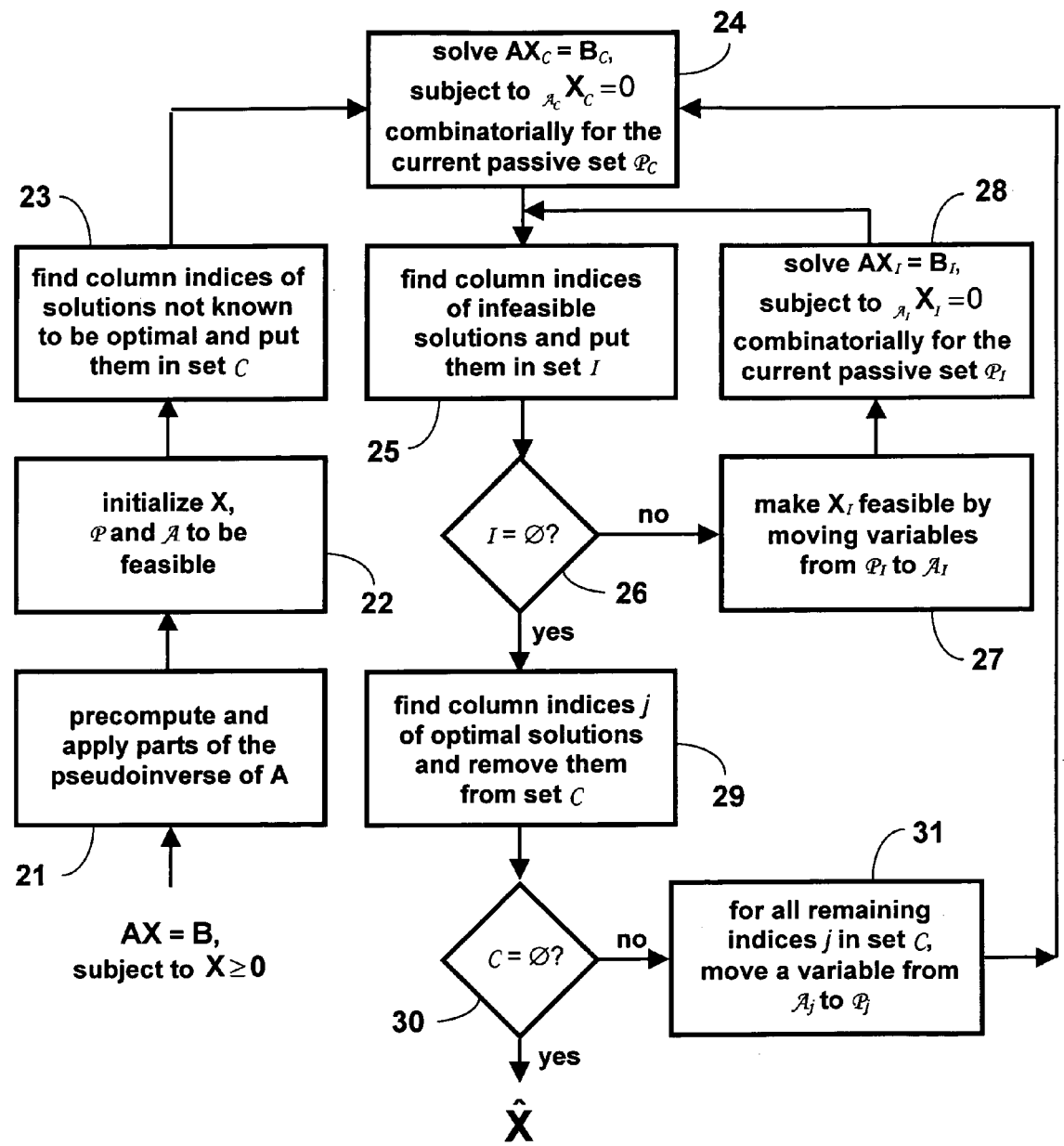
FIG. 2 shows a fast combinatorial algorithm for the solution of a non-negativity, inequality constrained least squares problem.

In FIG. 2 is shown is shown an exemplary flow diagram of the fast combinatorial algorithm for solving a multiple right-hand-side least squares problem AX=B, subject to the non-negativity constraint X≧0. Of course, the steps of the FC-NNLS algorithm can be generalized to the solve any inequality constrained least squares problem CX≧D using the combinatorial approach of the present invention.

At step 21, the parts of the pseudoinverse of A (e.g., $A^TA$ and $A^TB$, or R and $Q^TB$) that will remain constant throughout the calculation are precomputed.

At step 22, an initial feasible solution is chosen for X. The indices of the elements of X that have been initialized to zero are placed in the active set $\mathcal{A}$ and the elements of the passive set $\mathcal{P}$ are the indices of X that have been initialized to be greater than zero. It is standard to choose the zero-vector or zero-matrix as the initial feasible solution (i.e., a null passive set), and to assume that all variables are actively constrained. This would seem to be a particularly poor choice in the context of curve resolution applications. As pointed out by Gemperline and Cash in their discussion of the "self-modeling curve resolution research hypothesis," very few actively constrained variables are expected in the fitted model if the constraints accurately and precisely reflect the physical reality of the given experiment. See P. J. Gemperline and E. Cash, "Advantages of Soft versus Hard Constraints in Self-Modeling Curve Resolution Problems. Alternating Least Squares with Penalty Functions," *Anal. Chem.* 75, 4236 (2003). Therefore, a better choice may be to initially assume that all variables are passively constrained. This assumption is equivalent to obtaining a fully unconstrained least squares solution as the first step in the solution process. There are many methods available to perform the minimization (e.g., normal equations and orthogonal factorization). See A. Bjorck, *Numerical Methods for Least Squares Problems*, SIAM, Philadelphia (1996). The solution can then be made feasible by overwriting all negative values with zero to provide the initial active set variables. The initial passive set variables are then determined, namely, the positive entries in X. This produces the so-called overwriting approximation to NNLS, which has been commonly employed in MCR applications. See J. J. Andrew and T. M. Hancewicz, "Rapid Analysis of Raman Image Data Using Two-Way Multivariate Curve Resolution," *Applied Spectroscopy* 52, 797 (1998). In fact, a column of X is itself the optimal solution in the commonly encountered case that all elements are positive. With this choice of initializer, the rigorous least squares solutions obtained by the combinatorial NNLS algorithm are seen to be refinements of those obtained by the approximate overwriting method. This choice of initializer is similar in spirit to Bro's advanced-user mode in the sense that approximate active and passive sets are given to the NNLS algorithm up front. The current approach has the advantage, however, that the estimates are self-generated, thus avoiding the overhead associated with retaining copies of active and passive sets during ALS procedures.

At step 23, the column indices of the initial feasible solution that are not known to be optimal are put into a column set C. Note that, particular if a fully unconstrained least squares solution is used to obtain the initial feasible solution, many solution vectors may already be optimized and require no further processing. The non-optimal column indices can be partitioned into a passive set $\mathcal{P}_C$, containing the current passive sets of indices, and the complimentary active set $\mathcal{A}_C$, containing the current active sets of indices.

The remainder of the algorithm has a main loop/inner loop structure similar to that of the original Lawson and Hanson NNLS algorithm. The main loop serves to generate trial least squares solutions $X_C$ given the current passive set $\mathcal{P}_C$ and to test them for optimality. The inner loop accounts for the fact that the unconstrained least squares solution for a passive-set variable may become infeasible (i.e., contain negative values) at some point and provides a mechanism for moving variables from the passive set to the active set in order to make the solution feasible.

At step 24, a solution $X_C$ is obtained by combinatorially solving the least squares problem $AX_C=B_C$, subject to equality constraint $\mathcal{A}_C X_C=0$, for variables represented in the current passive set $\mathcal{P}_C$. The combinatorial solution can start with step 12 of the algorithm shown in FIG. 1, using the passive set $\mathcal{P}_C$ of column indices.

After the passive variables are initially solved for, the trial least squares solutions $X_C$ are tested for feasibility. A set I can index the infeasible solutions (i.e., those columns of $X_C$ having an element less than zero).

Therefore, at step 25, the column indices of the infeasible solution vectors in $X_C$ can be identified and put into the infeasible set I.

At step 26, if there are no infeasible solutions (i.e., set I is the null set), the algorithm proceeds to step 29. Otherwise, at step 27, the infeasible solution vectors in $X_C$ are made feasible by moving variables from the infeasible passive set $\mathcal{P}_I$ to the complementary active set $\mathcal{A}_I$. That is, $\mathcal{P}_I$ and $\mathcal{A}_I$ are subsets of the sets $\mathcal{P}_C$ and $\mathcal{A}_C$ that contain the passive sets and the active sets, respectively, of the indices of the infeasible solutions. A feasible solution can be obtained by selecting a search direction that is guaranteed, by the theory of convex functions, to lower the cost function. The details of the variable selection and movement strategies have been described by Lawson and Hanson, and Bro. The solution can then moved along the search direction until all variables satisfy the constraints. This has the effect of leaving at least one variable on the boundary of the feasible region and a single variable is moved from $\mathcal{P} \rightarrow \mathcal{A}$.

If m variables are found to be infeasible at a given point in the iteration, it may be highly probable that all m variables will be actively constrained in the final solution. In this situation, computational efficiency can be achieved by moving all of the m variables from $\mathcal{P} \rightarrow \mathcal{A}$ at one time. This is equivalent to applying the overwriting approximation to the inner loop of the standard NNLS algorithm. Note that the outer loop will make the proper adjustment to make the solution rigorous, in a least squares sense, in the event that one or more of the m variables has been guessed wrong.

At step 28, after making the infeasible solution vectors feasible, it is necessary to re-estimate the variables corresponding to the infeasible passive set $\mathcal{P}_I$ in the column set I. Again, the least squares estimates $X_I$ can be obtained in a combinatorial fashion by solving the least squares problem $AX_I=B_I$, subject to the equality constraint $\mathcal{A}_I X_I=0$, for the variables represented in the infeasible passive set $\mathcal{P}_I$. The combinatorial solution can start with step 12 of the algorithm shown in FIG. 1, using the passive set $\mathcal{P}_I$ of column indices. At step 25, the new least squares solutions $X_I$ are again tested for feasibility. The combinatorial the inner loop terminates when I has been emptied, thereby providing a current feasible solution $X_C$.

After the inner loop is completed and only feasible solutions have been obtained, each solution vector $X_j$ is tested for optimality. The optimality criteria have been described by Lawson and Hanson, and Bro Therefore, at step 29, the column indices j of the optimal solution vectors are identified and removed from the set C, thereby providing a new column set C representing solution vectors that are not optimal.

At step 30, the set C is checked for any remaining non-optimal column indices.

At step 31, for each solution vector $x_j$ that is not optimal (i.e., those indices j still remaining in set C), a variable is selected to be moved from the active set $\mathcal{A}_j$ to the passive set $\mathcal{P}_j$ to provide a new passive set $\mathcal{P}_C$ and complementary active set $\mathcal{A}_C$, for the subsequent iteration.

A single iteration of the FC-NNLS algorithm is completed for all of the non-optimal solutions indexed by set C before a subsequent iteration is started on any at step 24. The algorithm terminates when C becomes empty at step 30, providing the solution matrix $\hat{X}$.

Example of the Use of Active/Passive Set Algorithms for the Solution of the NNLS Problem The following example helps to clarify the differences between the serial approach of the standard NNLS algorithm of Lawson and Hanson and parallel approach of the combinatorial algorithm of the present invention. Consider first a NNLS problem with a single RHS. The following data can be modeled, after Eq. (1), as $$b = \begin{bmatrix} 92 \\ 74 \\ 18 \\ 41 \end{bmatrix}, \quad A = \begin{bmatrix} 95 & 89 & 82 \\ 23 & 76 & 44 \\ 61 & 46 & 62 \\ 49 & 2 & 79 \end{bmatrix} \quad (39)$$

The unconstrained least squares solution is shown below $$\hat{x} = \begin{bmatrix} -0.45 \\ 0.71 \\ 0.68 \end{bmatrix} \quad (40)$$

If the problem is solved using the standard NNLS algorithm, taking the zero vector as the initial feasible solution, the solution evolves as follows:

$$^0\hat{x} = \begin{bmatrix} 0 \\ 0 \\ 0 \end{bmatrix} \Rightarrow {}^1\hat{x} = \begin{bmatrix} 0 \\ 0 \\ 0.81 \end{bmatrix} \Rightarrow {}^2\hat{x} = \begin{bmatrix} 0 \\ 0.63 \\ 0.35 \end{bmatrix}. \quad (41)$$

Thus, the correct NNLS solution is obtained after r=2 iterations of the standard NNLS algorithm. The passive and active sets for the three solution vectors shown above are $$^0\mathcal{P} = \varnothing, {}^0\mathcal{A} = \{1,2,3\} \Rightarrow {}^1\mathcal{P} = \{3\}, {}^1\mathcal{A} = \{1,2\} \Rightarrow {}^2\mathcal{P} = \{2,3\}, {}^2\mathcal{A} = \{1\}. \quad (42)$$

The first and second iterations are merely equality constrained least squares problems that can be solved by the method of direct elimination.

The first step when performing a simple direct elimination problem of this type is to partition the matrices into the constrained and unconstrained parts as follows (for the final NNLS solution above)

$$b = Ax = [a_{\bullet 1}]x_1 + [a_{\bullet 2} \; a_{\bullet 3}]\begin{bmatrix} x_2 \\ x_3 \end{bmatrix} \quad (43)$$

$$\overline{b} = b - [a_{\bullet 1}]x_1 = [a_{\bullet 2} \; a_{\bullet 3}]\begin{bmatrix} x_2 \\ x_3 \end{bmatrix} \quad (44)$$

In non-negative least squares, the actively constrained element(s) are set to zero. Thus, the solution is simply the unconstrained least squares solution of the passive set vectors, viz., $$\overline{b} = b = \begin{bmatrix} 92 \\ 74 \\ 18 \\ 41 \end{bmatrix} \cong \begin{bmatrix} 89 & 82 \\ 76 & 44 \\ 46 & 62 \\ 2 & 79 \end{bmatrix}\begin{bmatrix} x_2 \\ x_3 \end{bmatrix}, \therefore \begin{bmatrix} \hat{x}_2 \\ \hat{x}_3 \end{bmatrix} = \begin{bmatrix} 0.63 \\ 0.35 \end{bmatrix} \quad (45)$$

and the standard NNLS solution is given in Eq. (41). Clearly now, NNLS can be viewed in terms of a projection of the data in b into the subspace defined by the columns of A whose indices are in the passive set, i.e., A$\mathcal{P}$ Defining x$\mathcal{P}$ and x$\mathcal{A}$ to be sets that contain the row indices of x belonging to the passive and active sets, respectively, Eq. (45) can be rewritten as $$x\mathcal{P} = A\mathcal{P}^+ B$$
$$x\mathcal{A} = 0 \quad (46)$$

The most important point here is that the pseudoinverse is a function of the particular passive set $\mathcal{P}$.

Given the nature of NNLS, a constrained problem with multiple RHS cannot be treated in the same way as an identical unconstrained least squares problem. Since the pseudoinverse can vary from column to column, one cannot simply precompute it once and apply it to each column of B as is the case with the unconstrained least squares solution. Consider the data above augmented by additional observations to provide a multiple RHS problem $$B = \begin{bmatrix} 92 & 99 & 80 \\ 74 & 19 & 43 \\ 18 & 41 & 51 \\ 41 & 61 & 39 \end{bmatrix} \quad (47)$$

The rigorous, non-negativity-constrained solution is given by $$\hat{x} = \begin{bmatrix} 0 & 0.82 & 0.30 \\ 0.63 & 0 & 0.30 \\ 0.35 & 0.15 & 0.30 \end{bmatrix} \quad (48)$$

with the corresponding passive sets $$\mathcal{P} = \{\{2,3\}\{1,3\}\{1,2,3\}\} \quad (49)$$

where $\mathcal{P}$ is an ordered set containing the passive sets, $\mathcal{P}_j$, for the corresponding $j^{th}$ columns of X. Since the passive sets differ among the three columns of X, separate pseudoinverse calculations are required for each solution. Given that the elements of the passive sets are not known without executing the NNLS algorithm, the traditional method of solving NNLS problems is to treat each column independently as a matter of course, as shown in Algorithms (35) and (37). Thus each column is solved in a serial fashion. The column-serial approach completely solves the NNLS problem for the $j^{th}$ column of X before beginning to solve the $j+1^{th}$ column. The evolution of the solution for the three-RHS example above is then $$^0\hat{x}_{\bullet 1} = \begin{bmatrix} 0 \\ 0 \\ 0 \end{bmatrix} \xrightarrow{1} {}^1\hat{x}_{\bullet 1} = \begin{bmatrix} 0 \\ 0 \\ 0.81 \end{bmatrix} \xrightarrow{2} {}^2\hat{x}_{\bullet 1} = \begin{bmatrix} 0 \\ 0.63 \\ 0.35 \end{bmatrix} \quad (50)$$

$$^0\hat{x}_{\bullet 2} = \begin{bmatrix} 0 \\ 0 \\ 0 \end{bmatrix} \xrightarrow{1} {}^1\hat{x}_{\bullet 2} = \begin{bmatrix} 0 \\ 0 \\ 0.87 \end{bmatrix} \xrightarrow{2} {}^2\hat{x}_{\bullet 2} = \begin{bmatrix} 0.82 \\ 0 \\ 0.15 \end{bmatrix}$$

$$^0\hat{x}_{\bullet 3} = \begin{bmatrix} 0 \\ 0 \\ 0 \end{bmatrix} \xrightarrow{1} {}^1\hat{x}_{\bullet 3} = \begin{bmatrix} 0 \\ 0 \\ 0.78 \end{bmatrix} \xrightarrow{2} {}^2\hat{x}_{\bullet 3} = \begin{bmatrix} 0 \\ 0.36 \\ 0.52 \end{bmatrix} \xrightarrow{3} {}^3\hat{x}_{\bullet 3} = \begin{bmatrix} 0.30 \\ 0.30 \\ 0.30 \end{bmatrix}$$

This methodology, while straightforward, tends to be computationally inefficient because it can result in redundant calculations. In the present case, seven pseudoinverses must be computed to complete the solution.

However, if the progression of passive sets by iteration is examined, $$^0\mathcal{P} = \{\emptyset \; \emptyset \; \emptyset\} \xrightarrow{1} {}^1\mathcal{P} = \{\{3\} \; \{3\} \; \{3\}\} \xrightarrow{2} {}^2\mathcal{P} = \quad (51)$$
$$\{\{2,3\} \; \{1,3\} \; \{2,3\}\} \xrightarrow{3} {}^3\mathcal{P} = \{\{2,3\} \; \{1,3\} \; \{1,2,3\}\}$$

it is observed that all of the columns share the same passive set on the first iteration and that two of the three columns share the same passive set on the second iteration. Thus, one would like to compute the pseudoinverse corresponding to $\mathcal{P}=\{3\}$, for instance, a single time and apply it to all three columns. Continuing in this manner would reduce the total count of pseudoinverse calculations in this example to four. These considerations suggest that it would be advantageous to execute the NNLS algorithm in a column-parallel approach in which the $i^{th}$ iteration of NNLS is performed for all columns before the $i+1^{st}$ iteration is begun for any column, as shown in Algorithms (36) and (38). Taking this approach, the example NNLS solution evolves as $$^0\hat{x} = \begin{bmatrix} 0 & 0 & 0 \\ 0 & 0 & 0 \\ 0 & 0 & 0 \end{bmatrix} \xrightarrow{1} {}^1\hat{x} = \begin{bmatrix} 0 & 0 & 0 \\ 0 & 0 & 0 \\ 0.81 & 0.87 & 0.78 \end{bmatrix} \xrightarrow{2} {}^2\hat{x} = \quad (52)$$

$$\begin{bmatrix} 0 & 0.82 & 0 \\ 0.63 & 0 & 0.36 \\ 0.35 & 0.15 & 0.52 \end{bmatrix} \xrightarrow{3} {}^3\hat{x} = \begin{bmatrix} 0 & 0.82 & 0.30 \\ 0.63 & 0 & 0.30 \\ 0.35 & 0.15 & 0.30 \end{bmatrix}$$

An added benefit of the column-parallel way of organizing the solution steps is that it facilitates the design of algorithms that are rich in matrix-matrix operations. This minimizes data movement and makes more effective use of the cache memories on modern processors, both leading to enhanced computational performance.

Therefore, the fast combinatorial algorithm of the present invention reorganizes the calculation in two ways. First, problems that share a common passive set are grouped and solved them together; and second, recognizing that the passive sets vary from iteration to iteration, each NNLS iteration is performed for all columns in parallel rather than performing all iterations for each column in series. Of course, as in this example, not all columns will require the same number of iterations to achieve optimality. It is a simple matter, however, to remove a given column from further consideration once it's optimal solution has been obtained.

In the example above, zero vectors were used to initialize the NNLS algorithm. As noted above, a better choice is to initially assume that all variables are passively constrained and then overwrite all negative values with zero. To the extent that the non-rigorous, overwriting method for approximating NNLS provides a reasonable estimate of the true active and passive sets, it provides a good initial feasible solution for rigorous NNLS. Given the foregoing example together with its overwriting solution, the rigorous NNLS solution can be obtained in a single iteration with a total of three pseudoinverse calculations.

$$^0\hat{x} = \begin{bmatrix} 0 & 0.92 & 0.30 \\ 0.71 & 0 & 0.30 \\ 0.69 & 0.14 & 0.30 \end{bmatrix} \xrightarrow{1} {}^1\hat{x} = \begin{bmatrix} 0 & 0.82 & 0.30 \\ 0.63 & 0 & 0.30 \\ 0.35 & 0.15 & 0.30 \end{bmatrix} \quad (53)$$

In fact, a column of $^0\hat{X}$ is itself the optimal solution in the commonly encountered case that all elements are positive, as in the third column above.

The final example shows a modest decrease in the number of pseudoinverses that must be computed, about a factor of two, as compared to the one-column-at-a-time serial approach. The decrease can become more dramatic as the number of RHS becomes much larger. For any p-pure component system, there exist $2^p$ possible passive sets. For the three-component example above, there are eight possible $\mathcal{P}$ and they are: $\{1,2,3\}, \{1,2\}, \{1,3\}, \{2,3\}, \{1\}, \{2\}, \{3\}$, and $\emptyset$. If one is solving a problem where the number of RHS is greater than $2^p$, one can necessarily save computational effort by grouping the columns that have identical passive sets and computing one pseudoinverse per passive set. In fact, if one initializes the NNLS algorithm with the overwriting solution then the number of possible passive sets that need to be considered decreases by one, since the all-positive columns of X are already solved in the NNLS sense. Even if $2^p-1$ is a number that is large compared to the number of RHS, the number of unique passive sets is usually smaller than the number of RHS if the constrained linear model is truly appropriate for the data. Thus, the fast combinatorial algorithm can be used to great advantage to solve these problems.

Performance Comparison of NNLS Algorithms

The fast combinatorial algorithm of the present invention can reduce the computational burden for rigorous NNLS solutions for problems with many more RHS than factors. Thus, the performance of the fast combinatorial algorithm was compared against the previous fast algorithms of Bro. To do so, both Bro's fast algorithm (FNNLS) and his alternate, advanced-user routine (FNNLSb) were downloaded from the Internet. See, "Non-negativity constrained least squares regression," (retrieved on 2004-04-24 from URL:http://www.models.kvl.dk/source/). The solution in Bro's standard FNNLS algorithm is initialized with all zeros. The FNNLSb algorithm, on the other hand, is initialized with estimates of the active and passive sets. In the comparisons, the known true passive and active sets were used to initialize FNNLSb. Times for the overwriting method were obtained by terminating the new fast algorithm after the initialization step. The overwriting method, while it doesn't provide the true least squares solution, should provide the fastest benchmark against which to measure the new algorithm. All programs were coded in Matlab® Version 7 (MATLAB, Ver. 7, The MathWorks, Inc., Natrick, Mass. 2004) and executed on a 1 GHz Pentium III computer containing 1 GByte of main memory. In all cases, least squares solutions were obtained by the method of normal equations. Cross-product matrices were precomputed for the rigorous NNLS algorithms and the times to do so are included in the totals, since frequently this was the most time-consuming step in the entire calculation. An exemplary Matlab Version 7 code implementation of the complete FC-NNLS algorithm is shown below:

```
function [X, P] = fcnnls(A, B)
% NNLS using normal equations and fast combinatorial strategy
%
% I/O: [X, P] = fcnnls(A, B);
%      X = fcnnls(A, B);
%
%    A is the mObs x pVar coefficient matrix
%    B is the mObs x nRHS matrix of observations
%    X is the pVar x nRHS solution matrix
%    P is the pVar x nRHS passive set logical array
%
% M. H. Van Benthem and M. R. Keenan
% Sandia National Laboratories
% P: set of passive sets, one for each column
% C: set of column indices for solutions that have not yet converged
% I: set of column indices for which the current solution is infeasible
% J: working set of column indices for which current solution is
optimal
% Check the input arguments for consistency *********************
error(nargchk(2,2,nargin))
[mObs, pVar] = size(A);
if size(B,1) ~= mObs
    error('Incompatible sizes of A and B')
end
nRHS = size(B,2);
% Precompute parts of pseudoinverse
AtA = A'*A;
AtB = A'*B;
opts.SYM=true;
opts.POSDEF=true;
% Obtain initial feasible solution and corresponding passive set
X = linsolve(AtA, AtB, opts);
P = X > 0;
X(~P) = 0;
C = find(~all(P));
maxiter = 3*pVar;
iter = 0;
W = zeros(pVar, nRHS);
% Active set algorithm for NNLS main loop *********************
while ~isempty(C)
    % Solve for the passive variables (uses subroutine below)
    X(:,C) = cssls(AtA, AtB(:,C), P(:,C));
    % Find any infeasible solutions
    I = C(find(any(X(:, C) < 0)));
    % Make infeasible solutions feasible
    while ~isempty(I) && (iter < maxiter)
        iter = iter + 1;
        [i,j] = find(P(:,I) & (X(:,I) < 0));
        linearIdx = sub2ind(size(X), i, I(j)');
        P(linearIdx) = 0;
        X(:, I)= cssls(AtA, AtB(:,I), P(:,I));
        I = I(find(any(X(:,I) < 0)));
    end
    if iter == maxiter
        error('Maximum number of inner loop iterations exceeded');
    end
    % Check solutions for optimality
    W(:,C) = AtB(:,C)–AtA*X(:,C);
    J = find(all(~P(:,C).*W(:,C) <= 0));
    C = setdiff(C, C(J));
    % For non-optimal solutions, add the appropriate variable to P
    if ~isempty(C)
        [mx, mxidx] = max(~P(:,C).*W(:,C));
        P(sub2ind([pVar nRHS],mxidx, C)) = 1;
    end
end
% ********************* Subroutines *********************
function [X] = cssls(AtA, AtB, P)
% Solve the set of equations AtB = AtA*X for the passive variables in
set P
% using the fast combinatorial approach
X = zeros(size(AtB));
opts.SYM=true;
opts.POSDEF=true;
if (nargin == 2) | isempty(P) | all(P(:))
    X = linsolve(AtA, AtB, opts);
else
    [pVar nRHS] = size(P);
    codedPset = 2.^(pVar-1:-1:0)*P;
```

-continued

```
    [sortedPset, sortedEset] = sort(codedPset);
    breaks = diff(sortedPset);
    breakIdx = [0 find(breaks) nRHS];
    for k = 1:length(breakIdx)-1
        cols2solve = sortedEset(breakIdx(k)+1:breakIdx(k+1));
        vars = P(:,sortedEset(breakIdx(k)+1));
    X(vars,cols2solve)=linsolve(AtA(vars,vars),AtB(vars,cols2solve),opts);
    end
end
```

In FIG. 3 is shown a table that summarizes the performance of each of these algorithms and the new FC-NNLS algorithm on 15 data sets. Most of the data were acquired as Energy Dispersive X-ray (EDS) spectral images. Details regarding several of these data sets are presented in the Kotula reference and that reference provides a general description applicable to all of the EDS data. One data set (data set 12) is a visible fluorescence image that has also been described previously. See Keenan et al., "Algorithms for constrained linear unmixing with application to the hyperspectral analysis of fluorophore mixtures," *Proc. SPIE, Imaginq Spectrometry VIII*, Vol. 4816, S. Shen, ed., 193 (2002). Data sets 3, 4 and 5 comprise the same actual data; they were analyzed for three different rank estimates, however. In all cases, the coefficient matrices A were obtained as the spectral pure components from previous MCR-ALS analyses, and these were used to estimate the pure-component concentrations at each pixel in the respective spectral images.

The table contains specific information about the data including dimensions (m and n) and estimated rank (p). Also contained in the table are some metrics related to the partitioning of the variables between the active and passive sets. In the final, optimal solutions, the variables that were actively constrained comprised 5% to 20% of the total. On average, more than 50% of the RHS columns contain at least one actively constrained variable. The two most interesting observations, however, are first, that the number of unique passive sets is only a small fraction of the total number of actively constrained RHS vectors and, second, as the number of factors increases, the number of unique passive sets is only a small fraction of total possible ($2^p$). It is these two characteristics of real data that make possible the performance improvements obtained using the new FC-NNLS algorithm.

As illustrated in FIG. 3, the FC-NNLS algorithm held a performance advantage in all cases examined. The ratios of the FNNLS solution times to those obtained by the FC-NNLS algorithm ranged from 15 to 126. Analogous ratios for the advanced-user algorithm FNNLSb range from 3 to 27. It should be noted that the latter comparisons are best-case for the performance of FNNLSb. Since the true active and passive sets were used to initialize the algorithm, no solutions were ever found to be infeasible (i.e., the inner loop was never entered), and computed solutions were always optimal. This would not be the case when only approximate active and passive sets are supplied, so the relative performance of FNNLSb in a real-world application would be worse. Perhaps the most telling performance comparison is with the overwriting method. For the smaller data sets, there is essentially no significant difference in the computation times between the approximate overwriting method and the rigorous FC-NNLS algorithm. Predictably, as the number of RHS becomes much larger, the advantages of the combinatorial strategy become more impressive.

Figure 4:
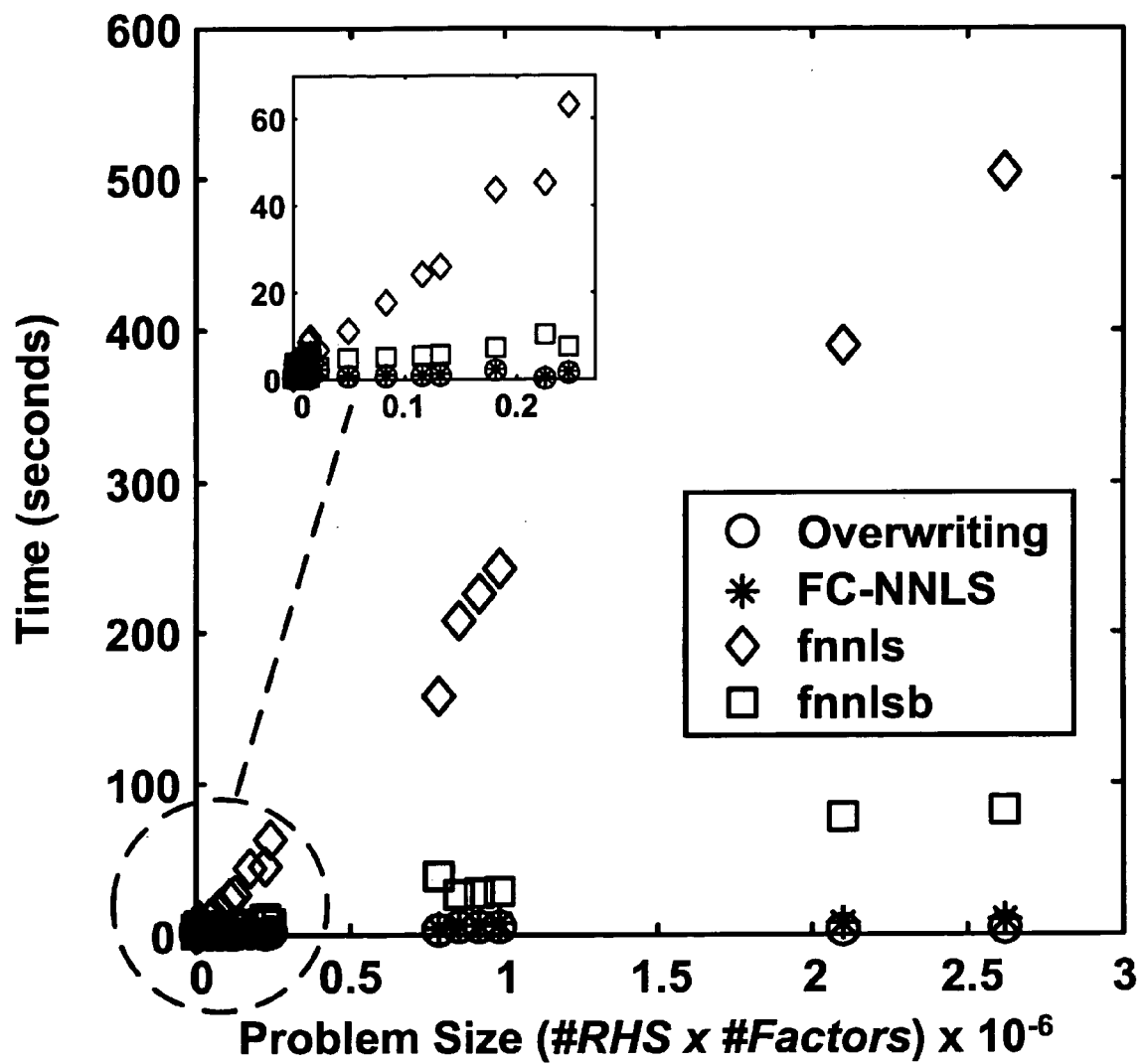
FIG. 4 shows a plot of computation execution time versus the product of n, the number of RHS, and p, the number of chemical components sought, for the data sets shown in FIG. 3.

In FIG. 4 is shown a graphical presentation of the timing data presented in FIG. 3. In general, computation times increased linearly with problem size, defined here to be the product of the number of factors and the number of RHS. Notably, the computation times obtained using FC-NNLS scale very slowly with problem size, and, in fact, are only marginally slower than the overwriting method for all but the very largest problems (data sets 2 and 15).

Combined Equality and Inequality Constraints

In the description of the FC-NNLS algorithm, it was shown that obtaining the solution to the inequality-constrained least squares problem could be reduced to solving a sequence of equality-constrained problems. Clearly, additional equality constraints, such as variable equality, can be accommodated simultaneously. Recall that the equality constraint matrices were represented by a p×n logical matrix V. The active-set variables at each iteration of the inequality-constrained problem can be represented in a similar manner. Using subscripts A and E to mean active constraints and equality constraints, respectively, the logical matrices can be combined by a boolean or operation:

$$V_{A+E} = V_A \vee V_E \qquad (54)$$

$V_{A+E}$ can then be used with the combinatorial approach to group like subproblems together and to impose all of the constraints at once.

Comparison with Prior Optimization Methods and Further Improvements

In all of the algorithms presented herein, the normal equations for the fully unconstrained problem were precomputed. This approach was introduced by Bro for the NNLS problem. Bro showed that during the normal equation solution process, the structural parts for problems comprising a subset of variables could be easily derived from the structural part of the full data matrix, namely:

$$_A\mathcal{P}^T A \mathcal{P} = \mathcal{P}_{(A^T A)} \mathcal{P}$$

$$_A\mathcal{P}^T B = \mathcal{P}_{(A^T B)} \qquad (55)$$

Thus, formation of the cross-product matrices $A^T A$ and $A^T B$ could be moved outside of the loop. Bro did not take the next step of moving the factorization outside of the loop, however, since $$chol(_A\mathcal{P}^T A \mathcal{P}) \neq \mathcal{P}_{(chol(A^T A))} \mathcal{P} \qquad (56)$$

Thus, the application of Bro's algorithm to the multiple RHS problem still requires at least n matrix factorizations per iteration. Note, also, that since there may be multiple solutions that need to be computed for each individual RHS, Bro's approach is effective for improving performance even in the single RHS case.

At this point, there are several things that can be done to further improve computational performance. First, the factorization can, in fact, be moved outside of the loop since efficient updating procedures are available such that:

$$chol(A^T A) \rightarrow \text{downdate} \rightarrow chol(_A\mathcal{P}^T A \mathcal{P}) \qquad (57)$$

Performance improvements have been demonstrated using downdating of the QR factorization and, since the Cholesky factor of $A^T A$ is simply the R matrix from the QR decomposition of A, there is an analogous updating scheme for Cholesky factorization as well. This approach can effectively improve performance in the single RHS case. Second, the combinatorial approach can be used with factorization updating and, finally, the sequence of updating operations can be ordered in an optimal way. Two approaches may be used. Removing the $k^{th}$ column from a p-column Cholesky factor requires p-k Givens rotations. Thus, removing the $p^{th}$ column requires no work. It is often the case, in practice, that one or two variables will be actively constrained much more frequently than the others. Permuting the order of the variables so the column indices of the more frequently constrained variables are closer to p can reduce the computational burden.

Finally, the combinatorial approach reduces the worst case number of factorizations by the ratio of n:$2^p$. For relatively large p, however, this can still be a large number of factorizations. Data set 6 in FIG. 3, for instance, had p=15 with over 1000 unique combinations of passive variables. In cases such as this, additional advantage can be gained by considering the order in which the passive variable groups are solved. That is, by carefully considering the ordering of the groups, it should be possible to move from the solution of one passive variable combination to that of a nearby combination through updating the factorization rather than by a full factorization. To put this in more concrete terms, consider a 3 variable system in which all $2^3 = 8$ combinations are present. The lexical sorting using binary code gives:

| Decimal | Binary |
|---------|--------|
| 0 | 000 |
| 1 | 001 |
| 2 | 010 |
| 3 | 011 |
| 4 | 100 |
| 5 | 101 |
| 6 | 110 |
| 7 | 111 | where a 1 indicates that the corresponding variable is in the passive set. Note that there is no relationship between the nearness of the group numbers and the similarity the problems to be solved. For example, 3 and 4 are adjacent groups but represent disjoint sets of passive variables. Given that these two passive sets are orthogonal, it is not efficient to try to update the solution for group 3 to that of group 4. Consider now the alternative scheme based on combinatorial gray codes:

| Decimal | Gray Code |
|---------|-----------|
| 0 | 000 |
| 1 | 001 |
| 2 | 011 |
| 3 | 010 |
| 4 | 110 |
| 5 | 111 |
| 6 | 101 |
| 7 | 100 |

In this case, successive groups differ by exactly one variable and we can readily move from one factorization to the next by either adding or deleting a single variable. As noted earlier, updating the factorization becomes relatively more efficient as the number of variables increases.

Of course the gray code scheme is neither unique, nor necessarily the best for real world problems. The basic idea of sorting the problems by similarity can be implemented in a variety of ways. In practice, it is generally found that actual passive set matrices are relatively dense in the sense that they contain mostly ones. In that case, a monotone gray code may be more efficient. Tree-based algorithms can also be constructed in an efficient manner such that when traversed, successive least squares problems are similar.

CONCLUSION

The fast combinatorial algorithm of the present invention can significantly reduce the computational burden when solving general equality and inequality constrained least squares problems with large numbers of observation vectors. The combinatorial algorithm provides a mathematically rigorous solution and operates at great speed by reorganizing the calculations to take advantage of the combinatorial nature of the problems to be solved. Using large data sets that are typical of spectral imaging applications and the particular case of non-negativity-constrained least squares, order-of-magnitude speed improvements have been obtained as compared to other recent fast NNLS algorithms. While Algorithm (38), FC-NNLS, was derived by considering Problem NNLS and the solution of unconstrained problems by normal equations, the framework expressed in the algorithm can be used, with very little modification, to solve much more general problems. By leaving the actual solution algorithm unspecified in Algorithm (38), other orthogonal factorization methods can be substituted for the normal equations (after performing the appropriate factorizations up front rather than forming the cross product matrices). The method of weighting can also be used to impose the active constraints, which further enables the possibility imposing non-negativity as a preference. For example, the weighting parameter can be adjusted to impose the constraints as a preference, thus allowing variables indexed by the active set to be slightly infeasible. Factorization updating, etc. can also be used.

The actual algorithms for testing solution feasibility, and for moving variables between the active and passive sets, have also not been fully specified in Algorithm (38). This enables the framework to easily handle other types of constraints with little modification. For instance, implementation of a solution to Problem BVLS (bounded variable least squares), where both upper and lower bounds are present, is a straightforward extension. Only the test for feasibility, and the strategy for moving variables between the active and passive sets needs to be changed to handle this problem. No changes are required to the parts of the algorithm concerned with solving for the passive variables. Likewise, combined non-negativity and variable equality constraints can be imposed in a natural way. These represent two different types of active constraints, but again, there is no change to passive variables solution procedure. The same combinatorial approach is not limited to NNLS, but can be used to great advantage for more general equality and inequality constrained least squares problems.

The present invention has been described as a fast combinatorial algorithm for the solution of linearly constrained least squares problems. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A fast combinatorial algorithm for estimating the pure component spectra and concentrations in multivariate spectral images by solving a multiple right-hand-side least squares problem AX=B, subject to a set of equality constraints $E_j X_j = F_j$, $j=1, 2, \ldots, n$, wherein A is an m×p matrix containing an m-channel pure component spectrum for each of p chemical components. B is an m×n matrix containing an m-channel spectrum observed at each of n pixels, and X is an p×n matrix containing the p pure component concentrations to be estimated at each of the n pixels in a sample image, comprising:

a) computing constant parts of the pseudoinverse of A;
b) partitioning column indices C of B into q column subsets $C_k$ corresponding to q unique constraint matrices $E_k$, $k=1, 2, \ldots, q$;
c) choosing a column subset Q to be a particular subset $C_k$ corresponding to a $k^{th}$ unique constraint that has not yet been solved;
d) forming a general set of linear equations using the constant parts of the pseudoinverse and the constraint matrices $E_k$ and $F_k$ for the column subset Q;
e) factoring the coefficient matrix of the general set of linear equations to provide an equivalent triangular set of linear equations;
f) solving the triangular set of linear equations for the $j^{th}$ column vector of X for a j in the column subset Q
g) repeating step f) until all column vectors of X corresponding to the column subset Q have been solved for; and
h) repeating steps c) through g) for a next column subset Q until all q column subsets have been solved for, thereby providing a solution matrix $\hat{X}$ of estimated component concentrations at the n pixels in the image.

2. The algorithm of claim 1, wherein the constant parts of the pseudoinverse comprise $A^T A$ and $A^T B$.

3. The algorithm of claim 2, wherein the general set of linear equations formed in step d) comprises the coefficient matrix $M = A^T A + \gamma^2 \text{diag}(vQ)$ and the right-hand-side $H = (A^T B)Q + \gamma^2 F Q$, where γ is a constant and vQ is a representation of the $k^{th}$ common constraint for the column subset Q.

4. The algorithm of claim 2, wherein the general set of linear equations formed in step d) comprises the coefficient matrix $$M = _{v_Q}(A^T A)_{v_Q}$$

and the right-hand-side $$H = _{v_Q}(A^T B)_Q - _{v_Q}(A^T A)_{v_Q^c v_Q^c} X_Q,$$

where vQ is the set of row indices for the subset of variables to be estimated in an unconstrained manner for the $k^{th}$ common constraint for the column subset Q.

5. The algorithm of claim 4, wherein the triangular set of linear equations provided in step e) is computed by Cholesky factorization G=chol(M).

6. The algorithm of claim 5, wherein the $j^{th}$ column vector of X is solved for in step f) using the Cholesky factors, according to the triangular set of linear equations $$G^T y = h_{\bullet j} \text{ and } G_{v_Q} x_{\bullet j} = y.$$

7. The algorithm of claim 1, wherein the constant parts of the pseudoinverse comprise R and $Q^T B$.

8. The algorithm of claim 1, wherein the equality constraint is applied by weighting.

9. The algorithm of claim 1, wherein the next column subset Q is chosen in step c) from an optimized sorting of the subsets of C, so that step e) comprises updating the previous factorization.

10. The algorithm of claim 9, wherein the sorting comprises combinatorial gray codes.

11. A fast combinatorial algorithm for estimating the sure component spectra and concentrations in multivariate spectral images by solving a multiple right-hand-side least squares problem AX=B, subject to an inequality constraint CX≧D, wherein A is an m×p matrix containing an m-channel pure component spectrum for each of p chemical components, B is an m×n matrix containing an m-channel spectrum observed at each of n pixels, and X is an p×n matrix containing the p pure component concentrations to be estimated at each of the n pixels in a sample image, comprising:
  a) computing the constant parts of the pseudoinverse of A;
  b) choosing an initial feasible solution for X and, for each column of X, partitioning the row indices into a passive set P, containing the sets of the indices of the variables that are unconstrained, and an active set A, containing the sets of the indices of variables that are constrained to equal the boundary value;
  c) putting the column indices of the initial feasible solution that are not known to be optimal into a column set C, thereby providing a passive set $P_C$ and a complementary active set $A_C$;
  d) solving for $X_C$ combinatorially according to $AX_C=B_C$, subject to $\mathcal{A}_C X_C=0$, for the variables represented in the current passive set $P_C$;
  e) identifying any infeasible solution vectors in $X_C$, putting their column indices in an infeasible set I, and making them feasible by moving variables from an infeasible passive set $\mathcal{P}_I$ to a complementary active set $\mathcal{A}_I$;
  f) solving for $X_I$ combinatorially according to $AX_I=B_I$, subject to $\mathcal{A}_I X_I=0$, for the variables represented in the infeasible passive set $\mathcal{P}_I$;
  g) repeating steps e) f) through f) g) until no infeasible solution vectors are obtained, thereby providing a current feasible solution $X_C$;
  h) identifying any solution vectors $x_{.j}$ that are not optimal and removing their column indices j from the column set C, thereby providing a new column set C representing solution vectors that are not optimal;
  i) for each column index j in column set C, moving a variable from the active set $\mathcal{A}_j$ to the passive set $\mathcal{P}_j$ for each non-optimal solution vector $x_{.j}$, thereby providing a new passive set $\mathcal{P}_C$ and new complementary active set $\mathcal{A}_C$; and
  j) repeating steps d) through i) until all solution vectors $x_{.j}$ are optimal, thereby providing a solution matrix $\hat{X}$ of estimated component concentrations at the n pixels in the image.

12. The algorithm of claim 11, wherein the constant parts of the pseudoinverse comprise $A^T A$ and $A^T B$.

13. The algorithm of claim 11, wherein the constant parts of the pseudoinverse comprise R and $Q^T B$.

14. The algorithm of claim 11, wherein the inequality constraint is a non-negativity constraint such that D=0 and C=I, the identity matrix.

15. The algorithm of claim 11, wherein the initial feasible solution for X is 0.

16. The algorithm of claim 11, wherein the initial feasible solution is obtained by solving the unconstrained least squares problem for X and overwriting all negative variables with zero.

17. The algorithm of claim 11, wherein step e) comprises moving, for each column index j in the infeasible set I, one or more variables from the passive set $\mathcal{P}_j$ to the complementary active set $\mathcal{A}_j$, using a theory of convex functions to select the variables to ensure that a cost function decreases.

18. The algorithm of claim 11, wherein step e) comprises moving all infeasible variables indexed in the passive set $\mathcal{P}_I$ to the complementary active set $\mathcal{A}_I$.

19. The algorithm of claim 11, wherein the combinatorial solutions of the equality constrained problems in steps d) and f) are obtained by the method of weighting.

20. The algorithm of claim 19, wherein a weighting parameter γ can be adjusted to impose the constraints as a preference, thus allowing variables indexed by the active set $\mathcal{A}$ to be slightly infeasible.

* * * * *